US005310819A

United States Patent [19]

Roland et al.

[11] Patent Number: 5,310,819

[45] Date of Patent: May 10, 1994

[54] SURFACE EPOXIDATION OF ELASTOMERS

[75] Inventors: Charles M. Roland, Waldorf, Md.; Irina Zemel, Arlington; Chester F. Poranski, Jr., Annandale, both of Va.

[73] Assignee: The United States of America as represented by the Secretary of the Navy, Washington, D.C.

[21] Appl. No.: 902,749

[22] Filed: Jan. 23, 1992

[51] Int. Cl.[5] ......................... C08F 8/08; C08C 19/06

[52] U.S. Cl. .................................... 525/385; 524/245

[58] Field of Search ......................... 525/385; 524/245

[56] References Cited

U.S. PATENT DOCUMENTS

| | | | |
|---|---|---|---|
| 3,661,874 | 5/1972 | Olson | 524/245 |
| 4,491,653 | 1/1985 | McGinniss et al. . | |
| 4,595,632 | 6/1986 | Mayhan et al. | 428/409 |
| 5,061,521 | 10/1991 | Endo et al. . | |

*Primary Examiner*—John Kight, III
*Assistant Examiner*—Richard L. Jones
*Attorney, Agent, or Firm*—Thomas E. McDonnell; George A. Kap

[57] ABSTRACT

Surface epoxidized elastomeric articles containing unsaturation are obtained by immersing the articles in an epoxidizing solution for a time sufficient to epoxidize at least some surface unsaturation in the articles.

11 Claims, No Drawings

SURFACE EPOXIDATION OF ELASTOMERS

FIELD OF INVENTION

This invention generally relates to oxidation of elastomers. More specifically, this invention relates to surface epoxidation of elastomers and to elastomers which have modified surface characteristics resulting from the surface epoxidation thereof.

DESCRIPTION OF PRIOR ART

Although possessed of exceptional physical properties such as strength, fatigue resistance and building tack (or autoadhesion), use of natural rubber in many applications is impractical or prohibited because of the undesirable consequences of absorption by natural rubber of hydrocarbon fluids such as hydraulic fluids or lubricating oils. The most common approach to protecting natural rubber or another elastomer from absorption of oils and fluids is to coat or paint it. This procedure is time consuming and may expose the user to hazardous primers and solvents. Additionally, the coating usually has different physical properties from the elastomer, particularly its modulus. This often results in cracking of the coating, especially in situations where the elastomer is deformed or stretched. There is the additional problem of assuring a good bond between the coating and the elastomer.

An alternative approach is to simply use an oil-resistant elastomer such as epoxidized natural rubber or nitrile rubber, if oil resistance is desired. However, this often entails a compromise in overall performance and the superior physical properties of natural rubber or another such elastomer must be sacrificed.

Epoxidized natural rubber is well known in the art for its resistance to oil. In the production of epoxidized natural rubber, latex or concentrate of natural rubber can be epoxidized with peracetic acid and hydrogen peroxide to yield epoxidized natural rubber having about 25-50% of all double bonds epoxidized. As the epoxidation reaction proceeds, the glass transition temperature increases linearly from $-72°$ C. for straight natural rubber to $+5°$ C. for 100% epoxidized natural rubber. Epoxidized natural rubber can be vulcanized with standard sulfur curing systems or with peroxide curing agents. The vulcanizates have high damping characteristics with low stress relaxation rates and low heat buildup. Epoxidation also significantly increases the resistance of natural rubber to swelling caused by hydrocarbons and thus, may be a replacement for nitrile rubber in certain applications.

Nitrile rubbers, known for their oil resistance, are random copolymers of butadiene and acrylonitrile. The amount of acrylonitrile now ranges between about 20% and about 60%. Although they are not suitable for tires, nitrile rubbers are noted for their oil resistance which implies low solubility, low swelling, good tensile strength and good abrasion resistance after immersion in gasoline or oils. There is a direct correlation between amount of acrylonitrile in the nitrile rubbers and oil resistance thereof. It is possible to obtain grades of nitrile rubbers of about 50% in acrylonitrile content with excellent oil resistance. Swelling of nitrile rubbers in polar solvents is greater than in non-polar solvents but nitrile rubbers can be used in contact with water and antifreeze. The nitrile rubbers are inherently less resilient than natural rubber. Heat resistance of nitrile rubbers is good and if properly protected by antioxidants, nitrile rubbers can show good resistance to oxidative degradation as well.

Nitrile rubbers are specialty rubbers and can be used in preference to natural rubber in certain applications; however, overall, natural rubber has better mechanical properties than nitrile rubbers. For instance, natural rubber has excellent tensile, elongation and resilience whereas the same properties of nitrile rubber are only good. When it comes to resistance to aliphatic hydrocarbons and resistance to aromatic hydrocarbons, natural rubber is poor on both counts, whereas nitrile rubber has excellent and good properties, respectfully.

U.S. Pat. No. 4,491,653 to McGinniss et al describes a method for fluorinating the surface of a polymeric solid by means of a diluted fluorine gas. The purpose of surface fluorination is to improve surface property of the solid while substantially maintaining the bulk physical properties intact. U.S. Pat. No. 5,061,521 to Endo et al describe surface halogenation of a polycycloolenfin article by immersing the article in an organic solvent containing dissolved molecular halogen. Improved properties resulting from surface halogenation include flame retardance and oxidation resistance.

SUMMARY OF INVENTION

It is an object of this invention to epoxidize the outer surfaces of an elastomer to render same more resistant to oil while retaining the bulk physical properties thereof substantially unchanged.

It is another object of this invention to epoxidize surfaces of an unsaturated elastomer with a dilute solution or dispersion of an epoxidizing agent in order to oxidize at least some unsaturated bonds of the elastomer in order to improve surface characteristics thereof without affecting bulk physical properties thereof.

It is another object of this invention to epoxidize surfaces of an unsaturated elastomer with a dilute solution or dispersion of an epoxidizing agent wherein the elastomer is relatively insoluble in the solvent or the diluent.

Another object of this invention is an elastomer having at least a portion of its outer surface epoxidized and having the properties of the inner bulk of the material unchanged and different from the surface properties.

Another object of this invention is an unsaturated elastomer having only its outer surface epoxidized whereby the bulk physical properties remain unchanged.

These and other objects of this invention are accomplished by epoxidizing surfaces of an unsaturated elastomer, especially natural rubber, with a dilute solution or dispersion of an epoxidizing agent whereby the surface unsaturation of the elastomer is reacted with the epoxidizing agent to thus change only the surface characteristics of the elastomer.

DETAILED DESCRIPTION OF INVENTION

This invention relates to surface-epoxidized elastomers and to a method for epoxidizing surfaces of unsaturated elastomers by immersing the elastomers in an epoxidizing agent. The epoxidizing agent can be used in the form of a dilute solution or dispersion wherein the solvent for the epoxidizing agent is not a solvent for the elastomers.

Peroxidation or epoxidation of a carbon-carbon double bond can be carried out with peroxybenzoic acid resulting in an epoxide or oxirane ring, as illustrated below:

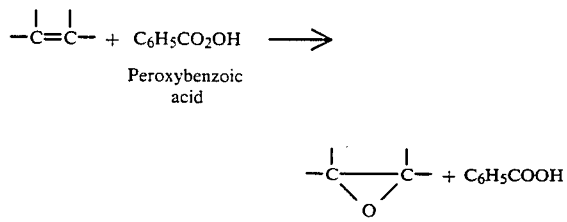

It is assumed that whatever is epoxidized contains unsaturation, such as a triple or a double bond, preferably a carbon-carbon double bond, as shown in the above illustration. The oxirane ring can be further reacted to form a carboxyl group or another group. Oxirane rings and carboxyl groups have the necessary polarity to impart resistance to hydrocarbon liquids. Limiting epoxidation to the surface by the use of a non-solvent as the reaction medium causes a portion of polymer chains in a solid elastomer near the surface thereof to be epoxidized, that is, chain segments close to the surface of the elastomer are reacted while other portions of the same macromolecule are unchanged. Hence, the "coating" or the altered surface of the elastomer that imparts oil resistance thereto is an intrinsic part of the elastomer mass. Removal of the "coating" requires destruction of the elastomer itself. Unlike paints or conventional coatings there is no delamination under deformation of the surface altered in the manner described and there is no diminution of the resistance to swelling by hydrocarbon solvents of the elastomers treated in the manner described herein.

The level of epoxidation, or the fraction of unsaturated carbons at the surface that are reacted, can be controlled by the adjustment of the temperature and the duration of the reaction by the selection of the epoxidizing reagent and medium in which the epoxidizing agent is dispersed or solubilized, and by the adjustment of the concentration of the epoxidizing agent in the medium. The level of surface epoxidation can be monitored by FTIR and it increases with time up to a point, following which it remains constant. Level of surface epoxidation can also be monitored by infrared evaluation of double bonds at the surface of the elastomer. Oil absorption by the elastomer decreases with increasing exposure time up to a point, following which it becomes essentially 0% by weight absorption. The depth over which the epoxidation takes place can be controlled by both the epoxidation time and temperature, as well as by the affinity between the epoxidizing medium (solvent) and the elastomer.

What is contemplated herein is surface epoxidation of unsaturated elastomers which includes any elastomer which has unsaturation in its structure be it triple bond or a double bond, preferably a carbon-carbon double bond. The presence of unsaturation is shown in the above epoxidation reaction where a peroxidizing agent, i.e., peroxybenzoic acid, is shown reacting with a carbon-carbon double bond of an elastomer to form an oxirane ring which is characterized by two carbon atoms joined in a three-member oxygen-containing ring.

With respect to surface epoxidation, an average size atom is regarded as having a diameter of less than 5 angstroms, more specifically, on the order of about 2 angstroms. Since the invention herein generally pertains to surface modification of elastomers, it is imperative that surface modification be defined to some extent since such products as epoxidized rubber are well known. Therefore, for purposes herein, epoxidation in accordance with the invention set forth herein, is carried out to where elastomer unsaturation is epoxidized to a depth of about 100 angstroms of the solid elastomer surface. With such a definition of surface epoxidation, this means that epoxide rings in the surface-epoxidized elastomer will extend to a depth of about 100 angstroms of the elastomer and beyond that point, elastomer unsaturation will be present. This is consonant with the objectives herein for modifying only surface characteristics of an elastomer without changing bulk properties thereof. Whereas about 25 to 50% of all double bonds are epoxidized in preparing epoxidized rubber, it is estimated that surface epoxidation pursuant to the invention herein results in epoxidation of 25 to 100%, preferably at least about 50% or 60%, of the double bonds at the surface. It should be understood that elastomer unsaturation referred to herein refers to backbone and pendant unsaturation. In preferred embodiment, elastomers are selected that have backbone unsaturation and no pendant unsaturation. Progress of epoxidation can be evaluated by FTIR and other techniques.

In their most useful state, elastomers must meet certain criteria. Elastomers must be able to recoverably stretch, reaching elongations of 500–1000% with low damping or little loss of energy as heat; they must exhibit high tensile strength and high modulus, typically 1 to 10 MPa; they must recover rapidly, exhibiting the phenomena of rebound; and they must recover their original dimensions almost fully on the release of stress, exhibiting the phenomena of resilience, creep resistance and low permanent set.

Suitable examples of unsaturated elastomers include natural rubber, synthetic rubber, neoprene or polychloroprene, polybutadiene, polyisoprene, nitrile rubber, butyl rubber, acrylic elastomers and various elastomer copolymers, especially EPDM.

Natural rubber, perhaps the most important of the elastomers contemplated herein, is cis -1,4- polyisoprene which occurs in over 200 species of plants; however, the Hevea tree accounts for nearly all of it today. This elastomer contains unsaturation in the chain itself, i.e., contains backbone unsaturation. Commercial grades of natural rubber contain 93–95% by weight cis -1,4- polyisoprene, moisture of 0.3–1.0% by weight, acetone extract of 1.5–4.5% by weight, protein of 2.0–3.0% by weight, and ash of 0.2–0.5% by weight. Natural rubber is soluble in most aliphatic, aromatic, and chlorinated solvents, but its high molecular weight makes it difficult or slow to fully dissolve it. Oil extended natural rubber is commercially available in various grades. The raw rubber portion may be either a latex or remilled-type rubber. Aromatic or non-staining cycloparaffinic oils are used at 10, 25, and 30% by weight. Oil-extended natural rubber with a high oil content crystallizes slowly and does not need premastication. Vulcanizate properties are similar to those of natural rubber vulcanizates if the oil is added during the mixing.

Nearly 40 years ago, synthetic rubber was synthesized from isoprene and was essentially identical in structure with natural rubber. Synthetic rubber is also nearly all cis polyisoprene with 1,4 addition structure and it differs from natural rubber in relative amounts of 1,4 and 1,3 addition structures. Synthetic rubber or polyisoprene rubbers are about 92% cis -1,4- polyisoprene and can be used as replacements for natural rubber except where tack-imparting properties are important.

Neoprene or polychloroprene is a polymer of 2-chloro-1,3-butadiene, also known as chloroprene, and represents a small fraction of the world market for elastomers. Neoprene is particularly relied on for its resistance to oxidation, oil and heat. Analysis of crystalline behavior and infrared absorption spectra shows that polychloroprene consists of linear sequences of predominantly trans -1,4 structure with small amounts of cis -1,4, 1,2 and 3,4 polymerization. It is only the trans -1,4 and cis -1,4 structures that have backbone unsaturation. The 1,2 and 3,4 structures have pendant unsaturation. The broad range of physical and chemical properties available in this family of chloroprene homopolymers and copolymers permits neoprenes to fulfill the requirements of many applications. All neoprene polymers are now prepared by free-radical emulsion polymerization.

With respect to polybutadiene, polymerization of butadiene is an example of addition polymerization wherein the repeating unit within the polymer chain has the same molecular weight as the entering monomer unit. Participation of both double bonds in the polymerization process gives rise to 1,4-addition, which can be cis -1,4 or trans -1,4 structures. Participation of a single double bond results in a vinyl or 1,2-addition. The two 1,4 structures contain backbone unsaturation whereas the two 1,2-polybutadienes contain pendant unsaturation. Butadiene is used primarily in production of general purpose rubbers. Tires and other fabricated rubber products account for over 80% of butadiene consumption. A conventional tire formulation calls for about 25% by weight polybutadiene.

The 1,4-polybutadiene is the principal form of the polybutadiene elastomer and has backbone unsaturation. It is a soft, easily solubilized hydrocarbon liquid elastomer which elastomer exhibits excellent dynamic properties, low hysteresis, and good abrasion resistance. A glass transition temperature of −102° C. has been reported for this rubber.

Isoprene polymerizes to yield four different basic structures of polyisoprene. The poly cis -1,4, trans -1,4, and 3,4 structures can be made in high purity but the poly -1,2 structure is obtained only in conjunction with the other three structures. The cis 1,4- polyisoprene structure is that of natural Hevea rubber but the trans -1,4- polystructure is that of naturally occurring Balata. Hevea is the familiar soft and elastic rubber whereas Balata is a hard, crystalline polymer which has been used for golf ball covers.

Nitrile rubbers are emulsion polymers of butadiene and acrylonitrile varying in acrylonitrile proportion from about 15 to about 50% by weight for oil resistance. These rubbers are primarily used for their resistance to swelling in oils and solvents.

Butyl rubber is a copolymer of isobutylene and 2–3% by weight isoprene, which is conventionally prepared at about −100° C. with a Friedel-Crafts catalyst. Principal use of this rubber is for inner tubes, sealants and extrusions. Its surface properties can be improved, especially with respect to swelling in oils and solvents, by epoxidizing backbone unsaturation provided by the isoprene comonomer in the polymer.

Acrylic elastomers are rubbery polymers, particularly copolymers, in which esters of acrylic acid constitute a major proportion. Specific examples of the common esters used in acrylic polymers include ethyl acrylate and butyl acrylate. Backbone unsaturation is provided by other unsaturated comonomers which provide backbone unsaturation after polymerization.

There are many other polymers, particularly copolymers, where a comonomer or comonomers provide unsaturation, particularly backbone unsaturation, in the polymerized form, which unsaturation at the surface can be epoxidized pursuant to the invention herein to improve surface properties of the copolymer. An example of such a copolymer is the ethylene-propylene-diene (EPDM) terpolymer which is a rubber polymer containing a small amount of up to about 5% by weight of a nonconjugated diene. In the EPDM rubber, it is the diene which provides backbone unsaturation which can be epoxidized pursuant to the invention herein. Other examples of such copolymers are the styrene copolymers with a diene comonomer or comonomers such as butadiene or isoprene. Backbone unsaturation in such copolymers are provided by either butadiene or isoprene comonomers.

Duration of the epoxidation can affect the level of surface epoxidation of the unsaturated elastomer. Although duration of epoxidation can be extended to days, it is obviously desired to keep it as short as possible. As should be apparent to one skilled in this art, level of epoxidation depends not only on the particular elastomer involved but also on temperature of the epoxidizing agent solution, epoxidizing agent employed, the particular solvent or diluent for the epoxidizing agent employed, concentration of the epoxidizing agent in the solution or dispersion, and other factors. As a practical matter, taking the above factors in consideration, duration of the epoxidation reaction should be from instantaneous or about 1 second to about 24 hours, preferably from about 1 second to about 1 hour, more preferably from about one second to about one quarter of one hour. In addition to a strong dependance on temperature, specifying duration of the epoxidation reaction in terms of time is of primary importance to achieving the desired level of epoxidation which yields the desired surface modification. Although it may be valuable to quantify the epoxidation reaction, the ultimate objective is the desired surface modification of an elastomer.

Concentration of the epoxidizing agent in the solvent or diluent will also affect level of epoxidation. The solvent and diluent referred to herein are the solvent and diluent for the epoxidizing agent not for the elastomer. Concentration of the epoxidizing agent in the solvent or the diluent should be 0.1 to 30% by weight, preferably 2 to 20%. Generally speaking, the epoxidizing agent solution should be dilute, on the order of 2–10% by weight /volume basis. Amount of epoxidizing agent can be calculated by considering the elastomer unsaturation and particular epoxidizing agent employed in order to obtain epoxidation of the desired level at the surface of the elastomer.

The solvent or the diluent for the epoxidizing agent should not swell the elastomer and should be inert thereto or swell the elastomer only to a very limited extent. Suitable solvents herein are organic solvents, normally paraffinic or cycloparaffinic mixed with alcohol. Examples of such solvents include pentane, n-hexane, cyclohexane, n-heptane, iso-octane, and the like, and mixtures thereof. Other suitable solvents for the epoxidizing agent include neat alcohols such as pentanol, hexanol, butanol, and the like. Preferred solvents for the epoxidizing agent are liquid at about room temperature. The affinity of the epoxidation medium for the elastomer appears to govern the penetration depth of the epoxidation process.

Temperature of the elastomer and the epoxidizing medium is desirably ambient or room temperature, for practical reasons. However, the epoxidation reaction is quicker at higher temperature. The epoxidation reaction can be carried out at about 0° to 160° C., preferably 15° to 100° C.

Surface epoxidation described herein can be carried out using a suitable epoxidizing agent such as a peracid, or peracetic acid, or with hydrogen peroxide in the presence of a carboxylic acid, such as acetic acid or formic acid, with or without a catalyst, such as sulfuric acid. Carboxylic anhydrides can be employed as alternatives to the corresponding carboxylic acids, such as acetic anhydride in place of acetic acid. The use of an anhydride results in higher concentration of a peracid formed in situ than would be the case if the corresponding carboxylic acid were employed. Other catalytic acids and acidic agents can be employed in place of the aforementioned sulfuric acid, such as p-toluenesulfonic acid or a cationic exchange resin such as a sulfonated polystyrene. Some representative examples of peracids which can be used in the surface epoxidation of elastomers include aliphatic and aromatic peracids, such as performic acid, peracetic acid, perpropanoic acid, perbutanoic acid, 2-methylperpropanoic acid, perpentanoic acid, perpalmitic acid, perstearic acid, chloroperacetic acid, dichloroperacetic acid, trichloroperacetic, trifluoroperactic acid, 2-chloroperbutanoic acid, 3-chloroperbutanoic acid, 4-chloroperbutanoic acid, methoxyperacetic acid, perbenzoic acid, m-chloroperbenzoic acid, phenylperacetic acid, and the like. Surface epoxidation can be carried out by immersing an elastomer article in a peracid solution or by adding a peroxide, such as hydrogen peroxide, and a carboxylic acid separately to the solvent or diluent to generate the peracid in situ.

The epoxidation reaction is believed to be stereospecific, which means that a trans-microstructure in the elastomer produces a trans-epoxide, while a cis-microstructure results in cis-epoxides. Excess peracids and acid decomposition by-products which remain after the epoxidation reaction has been completed, can be stripped from the epoxidation medium, such as by volatilization, or can be neutralized with a base.

In carrying the first group of epoxidation experiments hereunder, cured samples of natural rubber measuring about 25 mm x 75 mm x 2 mm were completely immersed in an epoxidation solution of 2-pentanol containing m-chloroperbenzoic acid, at room temperature of about 20° C. for periods of time varying from 1 hour to 4 days (96 hours). Concentration of the pentanol solution was about 10% weight/volume basis. Generally speaking, the level of epoxidation increased, as measured by FTIR-ATR of the rubber surface, for up to 9 hours of exposure of the rubber to the epoxidizing solution and leveled off thereafter. Oil absorption tests were carried out by exposing the weighed treated or epoxidized rubber samples to 2190-TEP hydraulic fluid for 24 hours and weighing the rubber samples after exposure to the hydraulic fluid (oil) after wiping off excess oil. Oil absorption decreased significantly with increased epoxidation. After 9 hours of epoxidation, oil absorption in the surface epoxidized rubber samples was negligible. Results are set forth in Table I, below, of hydraulic fluid absorbed by the epoxidized rubber after immersing the treated rubber samples in hydraulic fluid for 24 hours.

TABLE I

| Duration of the Sample Epoxidation Treatment | Hydraulic Fluid Gained |
|---|---|
| 1 hour | 30% |
| 2 hours | 16.3% |
| 4 hours | 4.6% |
| 5 hours | <2% |
| >24 hours | 0% |

The data in Table I shows that natural rubber samples epoxidized for 5 hours in the manner described, gained less than 2% hydraulic fluid. For comparison purposes, unepoxidized natural rubber samples had hydraulic fluid gain of 109% by weight after 24 hours.

The second group of experiments was carried out to determine, inter alia, if the epoxidation treatment was effective on filled rubber samples. Therefore, all rubber samples tested hereunder contained carbon black filler and the epoxidation medium here was identical to the one used in the first group of experiments, i.e., m-chloroperbenzoic acid epoxidizing agent in 2-pentanol solvent. Unepoxidized filled natural rubber samples, and natural rubber samples epoxidized for 10 hours in the manner described above, were tested hereunder to determine selected physical properties. Results of these tests are summarized in Table II, below:

TABLE II

| | Natural Rubber | Surface Epoxidized Natural Rubber |
|---|---|---|
| Oil Absorption After 5 Days in Hydraulic Fluid | 33% | 0% |
| Modulus, MPa (50 mm/min.) | 6.1 | 6.8 |
| Tensile Strength, MPa (50 mm/min.) | 19.8 | 19.0 |

On the basis of the results given in Table II, which are the averages of at least 4 tests, superiority of the surface epoxidized natural rubber is evident in that physical properties of the surface epoxidized rubber differed only slightly from natural rubber. Table II shows that oil absorption of the surface epoxidized natural rubber samples was 0%. Commercially available epoxidized natural rubber (e.g., ENR-25 and ENR-50 containing 25 and 50 mole percent bulk epoxidation, respectively) exhibited higher oil absorption (circa 5%) under similar conditions.

An established method of improving the oil resistance of elastomers is to paint or apply a coating. An experiment was carried out to compare the effectiveness of this method to the surface epoxidation procedure. A commercial coating (Chemlock 7701 primer and Chemglaze Z306 coating) was applied to natural rubber samples according to the manufacturer's suggested procedure. The results are indicated below in Table III:

TABLE III

| | SURFACE EPOXIDIZED | | Commercial Coating on Surface | |
|---|---|---|---|---|
| | initially | after stretching to 300% elongation | initially | after stretching to 300% elongation |
| oil absorption after 24 hours in 2190-TEP hydraulic fluid | 0% | 0% | 0% | 16% |

These results indicate that while painted-on coatings are effective in static situations, in the presence of mechanical deformation, they are prone to cracking. The loss of integrity of the coating causes a marked reduction in rubber's resistance to oil absorption. The surface epoxidation method of the present disclosure, on the other hand, remains completely effective even when the elastomer is deformed. The surface epoxidation involves polymer molecules that permeate into the bulk whereby the epoxidized surface layer is an integral part of the elastomer. Hence, no delamination or cracking occurs due to mechanical deformation.

What we claim:

1. An oil-resistant article comprising an elastomer, said oil-resistant article consisting essentially of an elastomeric outer surface and an elastomeric inner portion, said elastomer being epoxidized at least at a portion of said outer surface, said elastomer in said inner portion containing unsaturation, said inner portion and said outer surface having properties differing from each other due to said epoxidation of said outer surface.

2. Article of claim 1 wherein said elastomer is selected from the group consisting of natural rubber, synthetic rubber, and mixtures thereof.

3. Article of claim 2 wherein said outer surface is up to about 100 angstroms thick and essentially 100% epoxidized.

4. Article of claim 2 wherein said inner portion lacks epoxide rings and is selected from the group consisting of polychloroprene, polybutadiene, polyisoprene, nitrile rubber, butyl rubber, acrylic elastomers, ethylene-propylene-diene rubber, and mixtures thereof.

5. Article of claim 4 wherein said elastomer article has essentially 0 percent oil absorption when said elastomer is totally immersed in a hydraulic fluid for 24 hours at room temperature while stretched 300 percent.

6. Method for epoxidizing a surface of an unepoxidized elastomer having unsaturation in its structure consisting of the step of contacting said surface of said elastomer with an epoxidizing agent to provide epoxide rings on the surface of said elastomer; wherein said elastomer is selected from the group consisting of natural rubber, synthetic rubber, and mixtures thereof; wherein said epoxidizing agent is selected from the group consisting of peracids disposed in a medium; and wherein said medium is a nonsolvent for said elastomer.

7. Method of claim 6 wherein said medium is a solvent for said epoxidizing agent.

8. Method of claim 7 wherein said contacting step is carried out for a duration of 1 second to 24 hours and wherein said epoxide rings are on the surface of said elastomer and said elastomer has unsaturation in the interior thereof.

9. Method of claim 8 wherein said duration is 1 second to 1 hour and wherein said elastomer has different interior properties from surface properties due to the surface epoxidation.

10. Method of claim 9 wherein said medium is a liquid solvent for said epoxidizing agent with concentration of said epoxidizing agent in said solvent being 1 to 25 percent, on weight/volume basis; said contacting step includes the step of immersing said elastomer in said epoxidizing agent solution; and said epoxidizing agent solution is at about room temperature.

11. Method of claim 10 wherein said elastomer is selected from the group consisting of polychloroprene, polybutadiene, polyisoprene, nitrile rubber, butyl rubber, acrylic elastomers, ethylene-propylene-diene rubber, and mixtures thereof; said epoxidizing agent is m-chloroperbenzoic acid; said medium is 2-pentanol; said epoxide rings extend to a depth of up to about 100 angstroms with unsaturation being present beyond the depth of about 100 angstroms.

* * * * *